(No Model.)  3 Sheets—Sheet 1.

R. P. GARSED.
PNEUMATIC SIGNAL.

No. 292,481. Patented Jan. 29, 1884.

WITNESSES:
Louis Kuehn,
Victor Balas

INVENTOR
Robert P. Garsed
by his attorney
Chas A. Rutter (No Model.) 3 Sheets—Sheet 2.

R. P. GARSED.
PNEUMATIC SIGNAL.

No. 292,481. Patented Jan. 29, 1884.

WITNESSES:
Louis Kuebler.
Victor Balas

INVENTOR
Robert P. Garsed
by his attorney
Chas A. Rutter.

(No Model.)

R. P. GARSED.
PNEUMATIC SIGNAL.

No. 292,481.  Patented Jan. 29, 1884.

WITNESSES:
Louis Kuebler.
Victor Balas

INVENTOR
Robert P. Garsed
by his attorney
Chas. A. Rutter.

UNITED STATES PATENT OFFICE.

ROBERT P. GARSED, OF NORRISTOWN, PENNSYLVANIA.

PNEUMATIC SIGNAL.

SPECIFICATION forming part of Letters Patent No. 292,481, dated January 29, 1884.

Application filed November 28, 1883. (No model.)

*To all whom it may concern:*

Be it known that I, ROBERT P. GARSED, a citizen of the United States, and a resident of Norristown, in the county of Montgomery and State of Pennsylvania, have invented certain new and useful Improvements in Pneumatic Signals, of which the following is a specification.

The object of my invention is to furnish a simple, cheap, and effective pneumatic signal for household and railroad use.

In the accompanying drawings, forming part of this specification, and in which similar letters of reference indicate like parts throughout the several views, Figure 1 represents a side view of my invention as applied to household purposes; Figs. 2 and 4, side views of brackets for supporting bellows, bell, &c.; Figs. 3 and 5, end views of Figs. 2 and 4; Fig. 6, a view of the bell; Fig. 7, a top view of a device for striking bell; Fig. 8, a modification of the same; Fig. 9, a sectional view of pump; Fig. 10, a plan view of my invention as applied to a railroad; Fig. 11, an end view of the same; Figs. 12 and 13, sectional views of pumps; Fig. 14, a plan of pump and bracket for holding it; Fig. 15, a sectional elevation of bellows, showing bracket, coupler, bell, &c.; Fig. 16, an end view of bracket; Figs. 17 and 18, a side and front view of device for holding bellows to bracket; Fig. 19, a top view of arm for striking bell; and Fig. 20, a sectional elevation of a pump to be used on a railroad.

A, Fig. 1, represents an air-pump, which may be of any of the well-known forms. B is a bellows connected to A by a pipe, C. D is a bracket for supporting bellows and bell. E is the bell. F is an arm carried by bellows, and which starts the bell, and G is a pin in the bracket, against which the bell strikes upon its return. The rod which carries the bell is held by a pin or hook, H, and this rod may be furnished with a pin, a, upon which the arm F rests. When the pump A is operated the bellows B is rapidly expanded, and the bell is thrown out, and on its return it strikes the pin G and is sounded.

The pump as shown in Fig. 1 is suited for placing in a door-frame of a house, and the plunger, with rod, as shown, passing through the center of the flexible body held by the metal casing, is adapted to be pulled or pushed by a person ringing the bell by the system of air-pressure through pipe, bellows, &c.

The pin a, attached to the bell-rod, as shown in Fig. 6, is a modification of the supporting-pin i. (Shown in Figs. 2, 3, &c.) When the support of pushing-rod F is by pin a, the motion of bellows forward and backward is in an arc, which is not the case when support is from pin I. A contact of push-rod with pin a is kept by the push-rod being bifurcated to surround the bell-rod and resting upon said pin. The pushing-rod is kept in contact with the bell-rod by the gravity of the bell, which also causes a collapsion of bellows when the pressure of air from pump ceases, and after striking either abutting-pin a free vibration of bell-rod is permitted by the push-rod being open on one side. The rubber bellows, in its normal condition, is distended about one-third of its length as compared to what it is when fully distended, and returns to this length by its elasticity immediately after having been operated by the pump. The collapsion of bellows by gravity of bell is therefore but for a short distance, or until its face is on a line with pin G, and rendered easy by the blow of the rebound of the bell by being suddenly pushed away from its perpendicular position when normal, or upon its rebound by striking against the abutting-pin I, and hence a vibration of the bell occurs at the same time that it may be collapsing the bellows, and the rod which supports the bell being preferably a spring, a further ringing of the bell occurs, caused by the vibration of the bell-rod in its length below where it strikes against either abutting-pin. It will be understood that the apparatus is preferably operated suddenly, as is the case with an ordinary bell.

In Fig. 2 the arm F rests upon a pin, I, and the bell-rod b strikes this pin I, as well as the pin G. Fig. 3 shows an end view of this bracket and pins G and I. J is a projection from the bracket which supports the bellows.

In Fig. 4 the arm is guided by passing through a projection. K, of the bracket, which has a hole or slot in it, as shown in Fig. 5.

Figure 1:
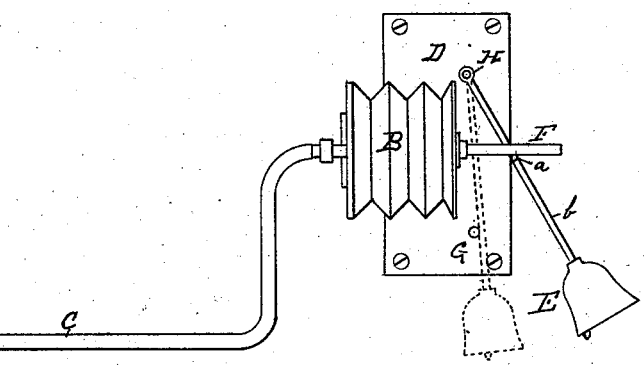
Figure 6:
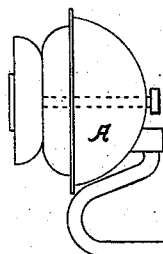
Fig. 6 represents a view of the bell E, showing pin a in rod b.
Figure 6:
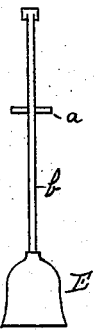
Figure 2:
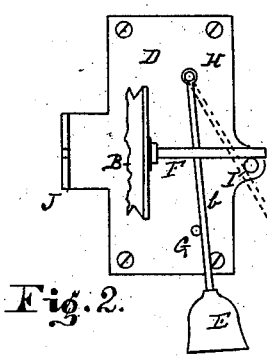
Figure 3:
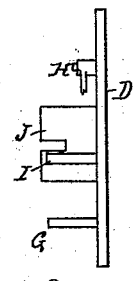
Figure 7:
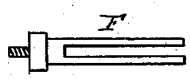
Fig. 7 is a top view of arm F, which is screwed into head of bellows.
Figure 8:
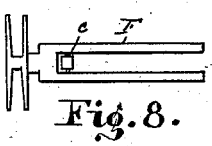
Fig. 8 is a top view of arm, showing a friction-wheel, c.
Figure 4:
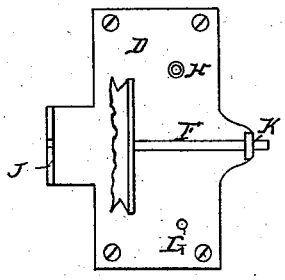
Figure 5:
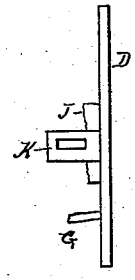
Figure 9:
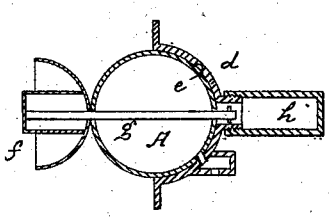
Figure 10:
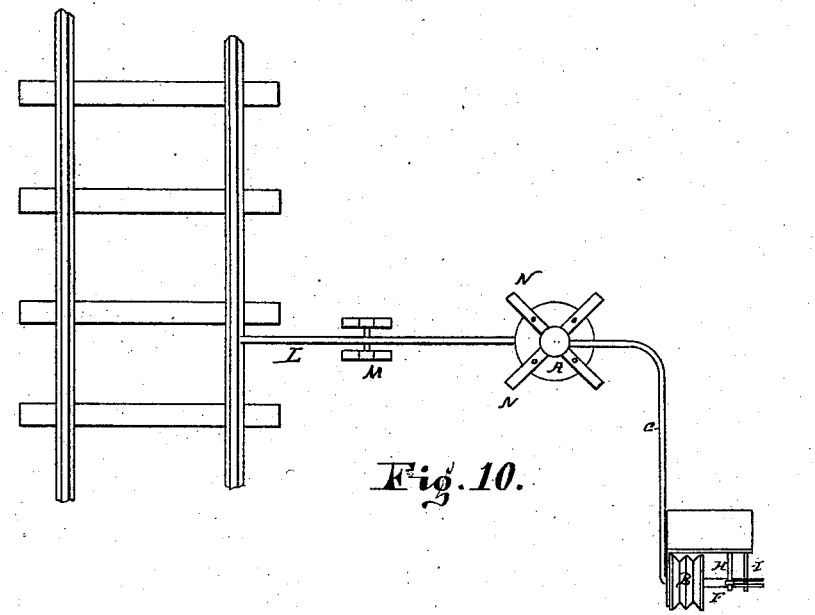

Fig. 9 is a sectional view of a pump. A is a rubber pump. d is the pump-holder, furnished with a groove, e. f is the plunger. g is a guide-rod. h is a cap, which is screwed over the end of holder d, and in which rod g works. This rod g passes completely through pump and holder, and by using the cap h no packing will be required.

Figure 11:
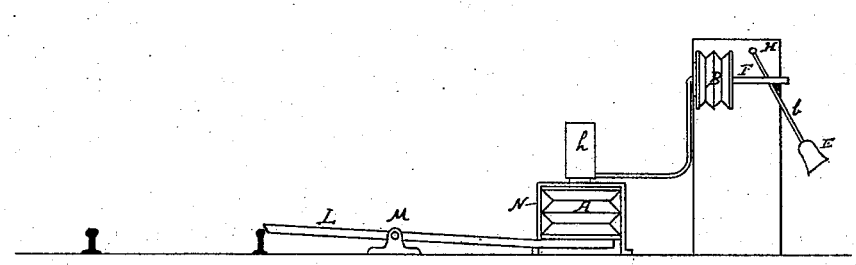
Figure 12:
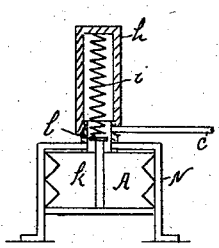

In Figs. 11 and 12 the device is represented as a railroad-signal. L is an arm, which is actuated by being run over by the tread of the wheels. This arm is pivoted at M, and its outside end bears against the bottom of a pump, A, which is supported by a bracket, N. This pump is held by its top and hangs down, and after being operated it either returns to its normal position by gravity or by the aid of a spring, or by being attached to arm L. In Fig. 12 a section of the pump is shown, i being a spring, and k a rod. This rod is attached to the head of the pump, and on its other end has a pin or collar, l, against which one end of the spring bears, the other bearing against the top of the cap h.

Figure 13:
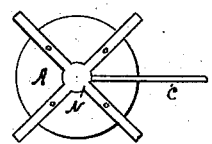
Figure 14:
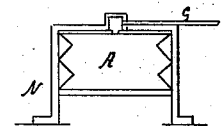

Fig. 13 is a sectional elevation of pump without spring or cap; and Fig. 14 is a plan of the same, showing the brackets. In this arrangement the alarm mechanism is similar to that already described.

Figure 15:
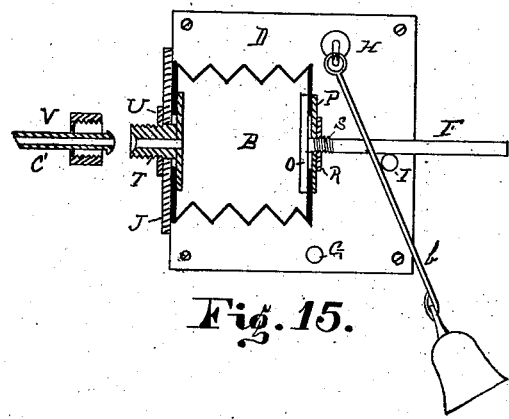
Figure 19:
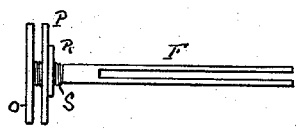

Fig. 15 is a sectional elevation of the bellows B, and shows bracket, bell, coupler, &c. F is the arm which strikes the bell, and which has cast on its end a flange, O, (see Fig. 19,) which is placed inside the bellows. P is a washer, which fits around F and bears against the front of the bellows. R is a collar, which is screwed on F at S, and by means of which the washer P may be tightly held against the end of the bellows and the arm F held in place.

Figures 17, 18:
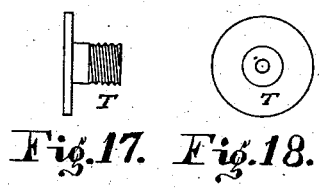

T, Figs. 15, 17, and 18, is a hollow flanged screw, which at the same time holds the bellows in place upon the bracket D, and forms one part of a coupling for the pipe C, of which the other parts are V and C, to which is attached the air-conveying pipe c. The flange on this screw T is placed inside the bellows, and the shank passes through the projection J of the bracket D, and is held in place by a collar or nut, U.

Figure 16:
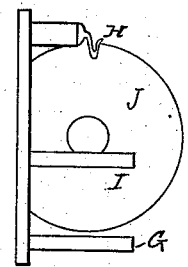

Fig. 16 is an end view of bracket D, and shows pins G and I, projection J, and hook H, upon which the bell is hung.

Figure 20:
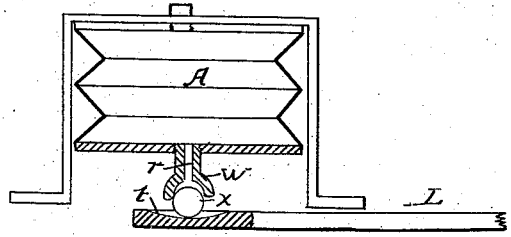

Fig. 20 is a sectional elevation of pump A, as applied to a railroad. This figure shows the bellows or pump having a cup, W, screwed or otherwise suitably fastened to its bottom. This cup has a hole, r, through it, and is fitted with a ball, X, of any suitable material. The lever L has at its end a concavity or hollow, t, in which this ball may rest. When L is struck by a train the ball is thrown up and closes the hole t, and prevents the escape of air. When the bellows falls the hole t is opened and facilitates the opening of the bellows. This ball X will also serve as a roller to prevent friction between the lever L and pump A during their operation.

Having thus described my invention, I claim—

1. In a pneumatic signal, in combination with pump A, pipe C, and bellows B, the bracket D, having a bellows-support, J, and suspended bell E, with push-rod adapted to actuate and allow a swinging motion of bell, the whole substantially as and for the purposes set forth.

2. In a pneumatic signal, the combination, with pump A, pipe C, and bellows B, the latter with actuating-rod F, of the bracket D, with bellows-support J, and a free vibrating bell, E, with abutting-pin I, said pin also serving for a support for actuating-rod F, substantially as described.

3. In combination, the pump, pipe, and bellows, and a signaling device, the bellows-support J, and flanged and threaded connecting device T, with washer U, said device adapted to hold bellows in place, as well as to form a coupling for air-supplying pipe, the flange, connecting piece, and coupling end being integral, the whole operating substantially as and for the purposes set forth.

4. In combination, the operative pump, with pipe and bellows, the latter having attached to it a bifurcated arm, F, adapted to surround bell-rod and actuate the same, and pin I, or its equivalent, supporting said arm, in combination with suspended bell, the whole operating substantially as and for the purposes set forth.

5. The pump with rod passing through its center, and the cap h, connected to the base of pump, and adapted to form an air-tight passage for said rod, in combination with the connected pipe and bellows, with support for the latter, substantially as shown and described.

6. In combination with the tracks of a railroad, the lever L, and pump A, with socket-connection for supplying air, the ball X, adapted to engage with and roll upon the lever L upon its operation, and stop the orifice r in said pump, connected pipe, and supported bellows, the whole operating substantially as shown and described.

7. In combination, the lever L, pump A, supporting-frame N, adapted to suspend said pump and allow the free motion of lever L between its supporting-links, the anti-friction ball X, and socket W, the connected pipe, operative bellows, and bracket D, with bell-ringing device, substantially as described.

R. P. GARSED.

Witnesses:
CHAS. A. RUTTER,
LOUIS KUEBLER.